US012692385B2

(12) United States Patent
Matsuo et al.

(10) Patent No.: US 12,692,385 B2
(45) Date of Patent: Jul. 28, 2026

(54) METHOD FOR PRODUCING ENCAPSULATED STRUCTURE AND EPOXY RESIN COMPOSITION

(71) Applicant: SUMITOMO BAKELITE CO., LTD., Tokyo (JP)

(72) Inventors: Makoto Matsuo, Tokyo (JP); Hidetoshi Seki, Tokyo (JP)

(73) Assignee: SUMITOMO BAKELITE CO., LTD., Tokyo (JP)

(*) Notice: Subject to any disclaimer, the term of this patent is extended or adjusted under 35 U.S.C. 154(b) by 178 days.

(21) Appl. No.: 18/283,650

(22) PCT Filed: Jan. 28, 2022

(86) PCT No.: PCT/JP2022/003322
§ 371 (c)(1),
(2) Date: Sep. 22, 2023

(87) PCT Pub. No.: WO2022/209239
PCT Pub. Date: Oct. 6, 2022

(65) Prior Publication Data

US 2024/0182705 A1 Jun. 6, 2024

(30) Foreign Application Priority Data

Mar. 31, 2021 (JP) ................................ 2021-059669

(51) Int. Cl.
*C08L 63/04* (2006.01)
*B29B 9/06* (2006.01)
(Continued)

(52) U.S. Cl.
CPC ................ *C08L 63/04* (2013.01); *B29B 9/06* (2013.01); *B29C 45/02* (2013.01);
(Continued)

(58) Field of Classification Search
CPC .......... B29B 7/42; B29B 7/823; B29B 7/826; B29B 7/90; B29B 7/92; B29B 9/06;
(Continued)

(56) References Cited

U.S. PATENT DOCUMENTS 5,698,152 A * 12/1997 Taruno .................... H01L 21/56 264/328.5
6,001,483 A 12/1999 Harada et al.
(Continued)

FOREIGN PATENT DOCUMENTS

JP 9-208805 A 8/1997
JP 2001-214030 A 8/2001
(Continued)

OTHER PUBLICATIONS

Wikipedia.org, "Carnauba wax", Feb. 12, 2020 (Year: 2020).*
(Continued)

*Primary Examiner* — Yunju Kim
(74) *Attorney, Agent, or Firm* — Birch, Stewart, Kolasch & Birch, LLP

(57) ABSTRACT

A method for producing an encapsulated structure, the method including:

a step of supplying granules or powder (1) formed from an epoxy resin composition to an extruder equipped with a screw (42) and a die (5) provided at the tip of the screw (42), and heating and melting the granules or powder (1) formed from the epoxy resin composition;

a step of extruding the molten epoxy resin composition through the die (5) having a predetermined opening shape by rotation of the screw (42);

a step of cutting the extruded epoxy resin composition (6) into a predetermined length to obtain a tablet formed from the epoxy resin composition, where the tablet has dimensions with a diameter of equal to or more than 40

(Continued)

mm and equal to or less than 100 mm and a length of equal to or more than 50 mm and equal to or less than 300 mm;

a step of transferring the tablet to a transfer molding machine having a molding mold (30) in which an object to be encapsulated is disposed; and a step of obtaining an encapsulated structure by encapsulating the object to be encapsulated (11, 12) in the molding mold with the epoxy resin composition by a transfer molding method of using the transfer molding machine, in which the epoxy resin composition includes:

an epoxy resin, a curing agent, an inorganic filler, a curing accelerator, and a wax having a melting point of equal to or higher than 30° C. and equal to or lower than 90° C.

2 Claims, 2 Drawing Sheets

(51) Int. Cl.

| | |
|---|---|
| ***B29C 45/02*** | (2006.01) |
| ***B29C 45/14*** | (2006.01) |
| ***B29C 48/00*** | (2019.01) |
| ***B29C 48/05*** | (2019.01) |
| ***B29K 63/00*** | (2006.01) |
| ***B29K 105/16*** | (2006.01) |
| ***B29L 31/00*** | (2006.01) |
| ***B29L 31/34*** | (2006.01) |

(52) U.S. Cl.

CPC .... *B29C 45/14819* (2013.01); *B29C 48/0022* (2019.02); *B29C 48/022* (2019.02); *B29C 48/05* (2019.02); *B29K 2063/00* (2013.01); *B29K 2105/16* (2013.01); *B29K 2995/0094* (2013.01); *B29L 2031/3425* (2013.01); *B29L 2031/7498* (2013.01); *C08L 2203/30* (2013.01)

(58) Field of Classification Search

CPC .............. B29C 45/02; B29C 45/14655; B29C 45/14819; B29C 48/0022; B29C 48/022; B29C 48/05; B29C 48/06; C08G 59/5073; C08G 59/621; C08G 59/686; C08G 59/687; C08G 59/688; C08L 63/00; C08L 63/04; C08L 91/06; H01L 21/56; H01L 21/67126

See application file for complete search history.

(56) References Cited

U.S. PATENT DOCUMENTS

| | | | | |
|---|---|---|---|---|
| 2019/0118408 A1 | | 4/2019 | Inokuchi et al. | |
| 2021/0002414 A1 | * | 1/2021 | Kotani | H01L 23/295 |

FOREIGN PATENT DOCUMENTS

| | | | | |
|---|---|---|---|---|
| JP | 2001-323133 A | 11/2001 | | |
| WO | WO2017/203943 A1 | 11/2017 | | |
| WO | WO-2018016405 A1 * | 1/2018 | | H10W 74/10 |
| WO | WO2019/057929 A1 | 3/2019 | | |
| WO | WO2020/129885 A1 | 6/2020 | | |

OTHER PUBLICATIONS

WO2018016405A1—Machine Translation (Year: 2018).*

International Search Report for PCT/JP2022/003322 mailed on Mar. 8, 2022.

Written Opinion of the International Searching Authority for PCT/JP2022/003322 mailed on Mar. 8, 2022.

* cited by examiner

METHOD FOR PRODUCING ENCAPSULATED STRUCTURE AND EPOXY RESIN COMPOSITION

TECHNICAL FIELD

The present invention relates to a method for producing an encapsulated structure and an epoxy resin composition to be used for the method. More specifically, the present invention relates to a method for producing an encapsulated structure by a transfer molding method by using a tablet-shaped epoxy resin composition.

BACKGROUND ART

In order to protect an electronic component such as a semiconductor element, or a structure such as a rotor from the external environment, a method of encapsulating the electronic component or the structure with a thermosetting resin has been widely employed. Particularly, a transfer molding method that uses an epoxy resin as an encapsulating resin is excellent in terms of economic efficiency and productivity and is suitable for mass production, and therefore, the method has become the mainstream of resin encapsulation.

Furthermore, regarding a molding method when performing transfer molding, a conventional method of preliminarily molding a resin composition for encapsulation into a tablet, and molding a large number of optical semiconductor devices by one-time molding using a large-sized tablet (for example, Patent Document 1).

RELATED DOCUMENT

Patent Document

[Patent Document 1] Japanese Unexamined Patent Publication No. 9-208805

SUMMARY OF THE INVENTION

Technical Problem

However, in the method of the related art, there have been occasions in which small voids are produced in an encapsulated molded article due to the air trapped in the central part of a large-sized tablet, or melting of the encapsulation resin composition occurs non-uniformly during transfer molding, causing unevenness in the density and characteristics of the resulting encapsulated molded article.

The present invention was achieved in view of such circumstances, and it is an object of the present invention to provide a method for producing a large-sized encapsulated structure with reduced generation of voids in the encapsulation material, by efficiently encapsulating an object to be encapsulated by using a large-sized encapsulation resin tablet.

Solution to Problem

The inventors of the present invention found that a large-sized encapsulated structure may be produced with excellent production efficiency by carrying out from the production of a large-sized encapsulation resin tablet to the encapsulation of an object to be encapsulated in a series of steps, thus completing the present invention.

According to the present invention, there is provided a method for producing an encapsulated structure, the method including:

a step of supplying granules or powder formed from an epoxy resin composition to an extruder equipped with a screw and a die provided at a tip of the screw, and heating and melting the granules or powder formed from the epoxy resin composition;

a step of extruding the molten epoxy resin composition through the die having a predetermined opening shape by rotation of the screw;

a step of cutting the extruded epoxy resin composition into a predetermined length to obtain a tablet formed from the epoxy resin composition, where the tablet has dimensions with a diameter of equal to or more than 40 mm and equal to or less than 100 mm and a length of equal to or more than 50 mm and equal to or less than 300 mm;

a step of transferring the tablet to a transfer molding machine having a molding mold in which an object to be encapsulated is disposed; and a step of obtaining an encapsulated structure by encapsulating the object to be encapsulated in the molding mold with the epoxy resin composition by a transfer molding method of using the transfer molding machine, in which the epoxy resin composition includes:

an epoxy resin, a curing agent, an inorganic filler, a curing accelerator, and a wax having a melting point of equal to or higher than 30° C. and equal to or lower than 90° C.

Furthermore, according to the present invention, there is provided a tablet for use in the method for producing an encapsulated structure, in which the tablet has dimensions with a diameter of equal to or more than 40 mm and equal to or less than 100 mm and a length of equal to or more than 50 mm and equal to or less than 300 mm, and the tablet is formed from an epoxy resin composition including:

an epoxy resin, a curing agent, an inorganic filler, a curing accelerator, and a wax having a melting point of equal to or higher than 30° C. and equal to or lower than 90° C.

Advantageous Effects of Invention

According to the present invention, there are provided a method for producing a large-sized encapsulated structure with excellent production efficiency, and an encapsulation resin tablet that may be used for the method.

DESCRIPTION OF EMBODIMENTS

Figure 1:
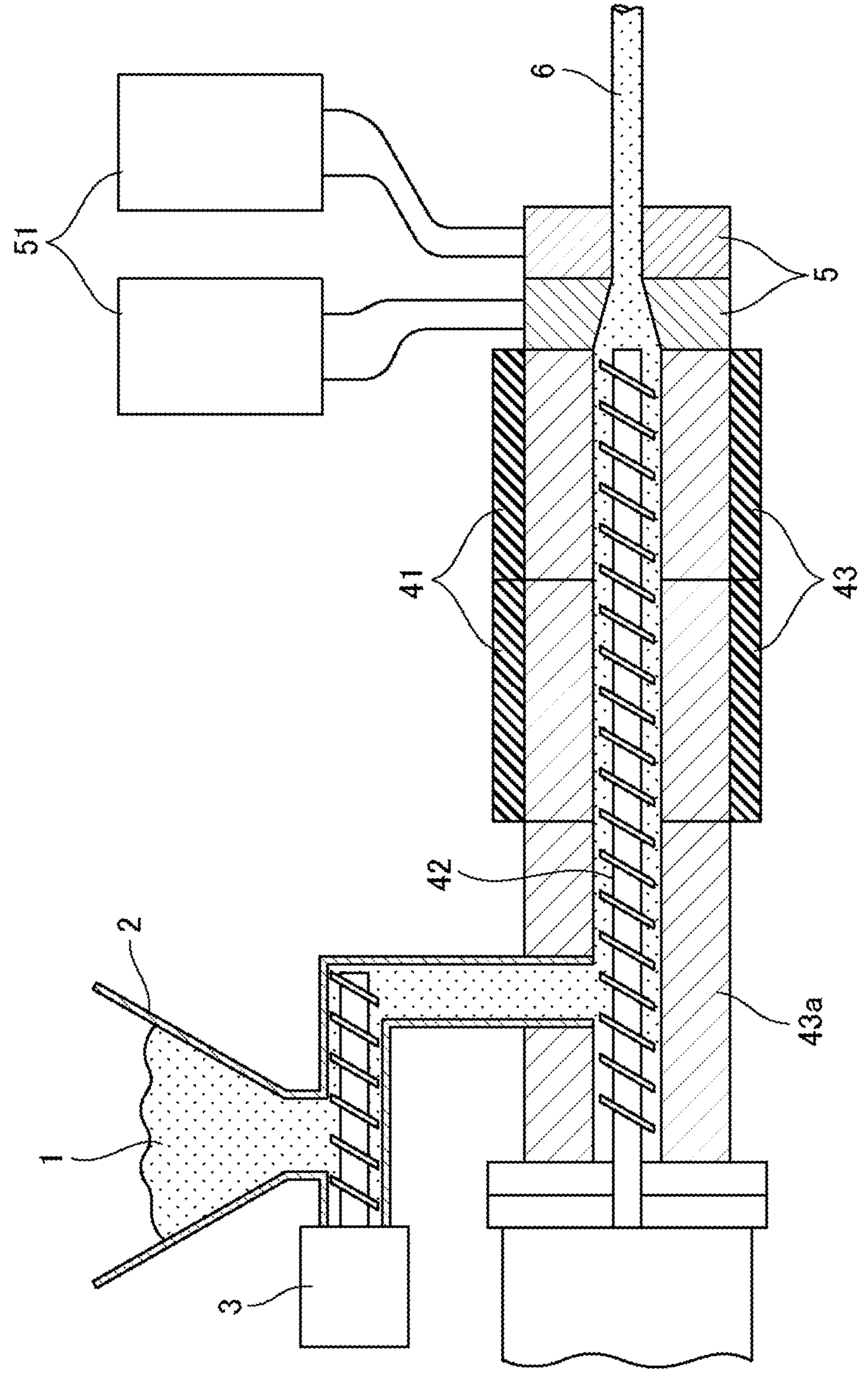
FIG. 1 is a vertical cross-sectional view of an extruder according to an example of the present embodiment.

Hereinafter, embodiments of the present invention will be described with reference to the drawings. In all the drawings, similar constituent elements will be assigned with similar reference numerals, and description thereof will not be repeated.

(Method for Producing Encapsulated Structure)

The method for producing an encapsulated structure of the present embodiment includes the following steps 1 to 5.

Step 1: Granules or powder formed from an epoxy resin composition are supplied to an extruder equipped with a screw and a die provided at the tip of this screw, and these granules or powder are heated and melted.

Step 2: The molten epoxy resin composition obtained in Step 1 is extruded through a die having a predetermined opening shape by rotation of the screw.

Step 3: The epoxy resin composition extruded in Step 2 is cut into a predetermined length to obtain a tablet formed from this epoxy resin composition.

Step 4: The tablet obtained in Step 3 is transferred to a transfer molding machine provided with a cavity in which an object to be encapsulated is disposed.

Step 5: An encapsulated structure is obtained by encapsulating the object to be encapsulated in the cavity with this epoxy resin composition by a transfer molding method of using a transfer molding machine.

In the following description, each step will be described.

The above-described step 1 to step 3 are carried out using an extruder. FIG. 1 shows a vertical cross-sectional view of an extruder according to an example of an embodiment of the present invention. That is, the extruder has a hopper 2, into which a granular or powdered epoxy resin composition 1 is charged, and a die 5 fitted to the tip of an extruder, the die 5 having an opening with the same shape as a predetermined tablet cross-section and being temperature-controlled. In addition, the extruder is equipped with a heater 41 for heating a raw material powder through a cylinder 43, and incorporated inside the cylinder 43 and the cylinder on the input side 43*a* is a screw 42 which extrudes the granular or powdered epoxy resin composition 1 and kneads, while extruding, the epoxy resin composition 1 that has been melted by heating. Furthermore, a temperature regulator 51 for controlling the temperature of the die 5 is connected to the extruder.

The granular or powdered epoxy resin composition 1 is charged into the cylinder 43 in the extruder from a hopper 2 and is plasticized into a molten state by heating by a heater 41 and kneading by rotation of the screw 42 provided in the cylinder 43. This plasticized epoxy resin composition 1 is continuously extruded through the opening of the die 5 to be an extruded material 6. The extruded material 6 is cut into a predetermined tablet length by a cutter (not shown in the drawing), and thus a tablet-shaped epoxy resin composition is obtained.

In the present embodiment, the opening shape of the die 5 fitted to the tip of the extruder is the same opening shape as the cross-sectional shape of the tablet-shaped epoxy resin composition. Furthermore, when the opening shape is a circular shape, the dimension of the opening shape is, for example, equal to or more than 40 mm and equal to or less than 100 mm, and preferably equal to or more than 50 mm and equal to or less than 90 mm, in diameter. The opening shape, including its dimensions, is appropriately selected in accordance with the desired tablet shape.

In the present embodiment, the extruded material 6 extruded from the extruder is cut into a desired length by a cutter. This length is, for example, in the range of equal to or more than 50 mm and equal to or less than 300 mm, and preferably equal to or more than 100 mm and equal to or less than 200 mm. A tablet-shaped epoxy resin composition having dimensions in the above-described range is preferable because it has excellent meltability in subsequent transfer molding.

In the present embodiment, since the tablet-shaped epoxy resin composition can be continuously obtained, it is possible to efficiently produce a tablet-shaped epoxy resin composition having fewer voids and having a high tablet height. Furthermore, in the present embodiment, although it may vary depending on the composition of the epoxy resin, the epoxy resin composition can be extruded such that the cross-sectional shape of the extruded epoxy resin composition is the same as the cross-sectional shape of the predetermined tablet, that is, similarly to the opening shape of the die, by performing extrusion while attempting optimization of the epoxy resin composition temperature.

In addition, according to the present embodiment, a tablet-shaped epoxy resin composition having almost no voids or having no voids et all can be produced. Such a tablet-shaped epoxy resin composition can be realized by further optimizing the heating temperature, adjusting the opening shape of the die and the height of the tablet, and the like.

The optimization of the molding material temperature is appropriately selected according to the shape, dimensions, and composition of the target tablet, and specifically, the optimization can be performed by adjusting the operating conditions for the extruder. For example, regarding the speed of screw rotation at the time of extruding the molten epoxy resin composition, it is preferable to operate the screw at 15 to 35 rpm, and more preferably 20 to 30 rpm. Furthermore, regarding the conditions at the time of extruding the molten epoxy resin composition, it is preferable to use the conditions of a temperature of 80° ° C. to 100° C. and a pressure of 10 to 30 bar.

Regarding the die temperature, it is preferable to operate the die by a temperature regulator 51 at 80° C. to 100° C., and more preferably in the range of 85° ° C. to 90° C. Regarding the temperature setting of the die, it is necessary to regulate the temperature such that the diameter of the extrusion-molded tablet satisfies the tolerance value and the external appearance of the tablet is smooth.

The tablet-shaped epoxy resin composition obtained in step 3 is transferred to a transfer molding machine (not shown in the drawing) (step 4). Preferably, in the step 3 and step 4, the tablet-shaped epoxy resin composition is transferred as it is in situ, that is, without taking out the tablet-shaped epoxy resin composition obtained in step 3, to the transfer molding machine.

The subsequent encapsulation step is carried out by the following steps.

Figure 2:
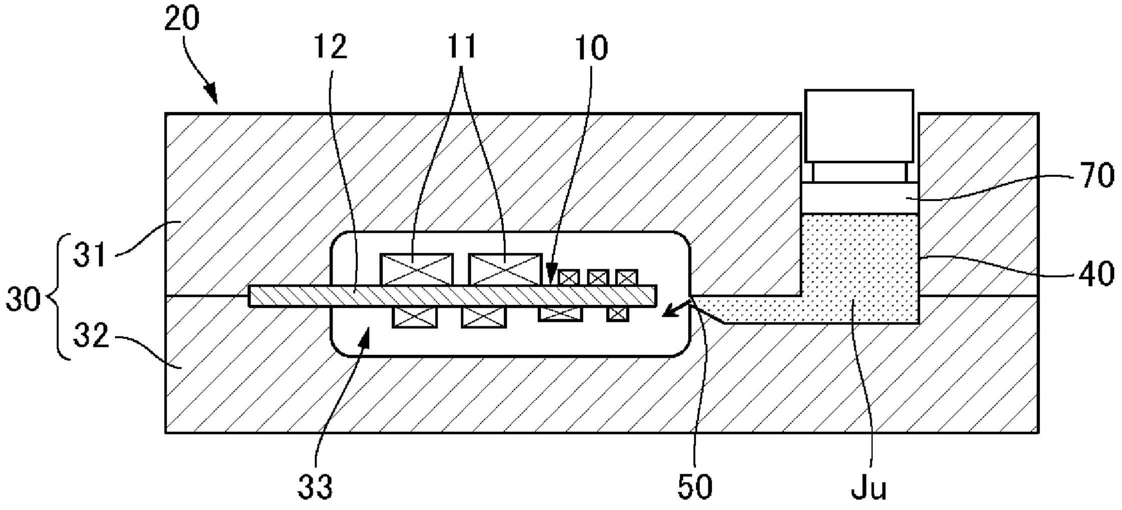
FIG. 2 shows a cavity connected to a transfer molding machine according to an example of the present embodiment, the cavity accommodating an object to be encapsulated.

First, as shown in FIG. 2, for example, a circuit board 12 on which an electronic component 11 is packaged is prepared as an object to be encapsulated. Next, as shown in FIG. 2, a molding mold 30 is opened, and the circuit board 12 is placed in the molding mold. Next, as shown in FIG. 2, a tablet is put into a pot 40, and the molding mold 30 is clamped. Next, the molten epoxy resin composition Ju contained in the pot 40 is supplied to a cavity 33 through a gate 50 by a plunger 70 to fill the cavity, and the resin raw material Ju filled in the cavity 33 is directly subjected to pressure-keeping. After the resin raw material Ju that has encapsulated the circuit board 12 is solidified into an encapsulation resin, the molding mold 30 is opened, and then an electronic control device 10 in a state of having the circuit board 12 encapsulated therein is taken out.

The above-described step of encapsulating the object to be encapsulated is carried out, for example, at a temperature of equal to or higher than 120° C. and equal to or lower than 200° C. and a pressure of equal to or higher than 3 MPa and equal to or lower than 15 MPa. Preferably, the step is carried out at a temperature of 140° ° C. to 180° C. and a pressure of 5 to 12 MPa. As a result, an encapsulated structure having excellent reliability and having no voids generated therein can be obtained.

In a preferred embodiment, the extruder and the transfer molding machine are coupled, and the tablet-shaped epoxy resin composition extruded through the die 5 of the extruder is directly transferred to the pot 40 of the transfer molding machine. As a result, the above-described step 1 to step 5 are carried out in a series of steps.

(Structure to be Encapsulated)

The object to be encapsulated in the encapsulated structure is not limited to the circuit board on which the electronic component is packaged, and examples thereof include a rotor core to which a magnet is fixed (see International PCT Publication No. WO 2012/029278 and the like), a stator core in which a coil and the like are insulated (see Japanese Unexamined Patent Publication No. 2020-094092 and the like), and an in-vehicle electronic control unit (see International PCT Publication No. WO 2016/139985 and the like).

A rotor core will be described. A permanent magnet is inserted into a hole part provided in the rotor core, and the permanent magnet is fixed to the rotor core by filling a resin composition for encapsulation into the space between the hole part and the permanent magnet. In this step of filling the resin composition for encapsulation, the method for producing an encapsulated structure of the present invention can be applied. By applying the method for producing an encapsulated structure of the present invention, excellent effects of the present invention are obtained, and an increase in the size of the rotor core and simultaneous production of a plurality of rotor cores can be achieved.

A stator core will be described. A stator core has a plurality of teeth, and a coil is wound around the plurality of teeth. At this time, it is necessary to insulate the coil from the stator core, and insulation can be achieved by interposing a resin composition for encapsulation therebetween. In this step of interposing the resin composition for encapsulation, the method for producing an encapsulated structure of the present invention can be applied. By applying the method for producing an encapsulated structure of the present invention, excellent effects of the present invention are obtained, and an increase in the size of the stator core and simultaneous production of a plurality of stator cores can be achieved.

An in-vehicle electronic control unit will be described. As an in-vehicle electronic control unit, a product obtained by encapsulating a substrate on which an electronic component or the like is mounted, with a resin composition for encapsulation is being investigated. In this step of encapsulating with the resin composition for encapsulation, the method for producing an encapsulated structure of the present invention can be applied. By applying the method for producing an encapsulated structure of the present invention, excellent effects of the present invention are obtained, and an increase in the size of the in-vehicle electronic control unit and simultaneous production of a plurality of electronic control units can be achieved.

<Resin Composition for Encapsulation>

The epoxy resin composition (in the present specification, may be referred to as "resin composition for encapsulation") that constitutes a bullet used for encapsulating an object to be encapsulated in the production of the encapsulated structure, will be described below.

The resin composition for encapsulation of the present embodiment includes an epoxy resin, a curing agent, an inorganic filler, a curing accelerator, and a wax having a melting point of equal to or higher than 30° C. and equal to or lower than 90° C. Hereinafter, each component will be described.

[Epoxy Resin]

Examples of the epoxy resin used in the resin composition for encapsulation of the present embodiment include phenol resins, including novolac type phenol resins such as a phenol novolac resin, a cresol novolac resin, and a bisphenol A novolac resin, and resol type phenol resins; epoxy resins, including novolac type epoxy resins such as a phenol novolac type epoxy resin and a cresol novolac type epoxy resin, bisphenol type epoxy resins such as a bisphenol A type epoxy resin and a bisphenol F type epoxy resin, aromatic glycidyl amine type epoxy resins such as N, N-diglycidyl aniline, N, N-diglycidyl toluidine, diaminodiphenylmethane type glycidyl amine, and aminophenol type glycidyl amine, hydroquinone type epoxy resins, biphenyl type epoxy resins, stilbene type epoxy resins, triphenolmethane type epoxy resins, triphenolpropane type epoxy resins, alkyl-modified triphenolmethane type epoxy resins, triazine nucleus-containing epoxy resins, dicyclopentadiene-modified phenol type epoxy resins, naphthol type epoxy resins, naphthalene type epoxy resins, and aralkyl type epoxy resins such as a phenol aralkyl type epoxy resin having a phenylene and/or biphenylene skeleton and a naphthol aralkyl type epoxy resin having a phenylene and/or biphenylene skeleton; and aliphatic epoxy resins, including alicyclic epoxies such as vinyl cyclohexene dioxide, dicyclopentadiene oxide, and alicyclic diepoxy-adipate. These may be used singly or as mixtures of two or more kinds thereof.

The content of the epoxy resin is preferably equal to or more than 5% by mass and equal to or less than 40% by mass, and more preferably equal to or more than 10% by mass and equal to or less than 20% by mass, with respect to the total amount of the resin composition for encapsulation.

[Curing Agent]

The resin composition for encapsulation of the present embodiment includes a curing agent for three-dimensionally crosslinking the epoxy resin. As the curing agent, for example, a phenol resin-based curing agent is preferably used. Examples of the phenol resin-based curing agent include novolac type resins such as a phenol novolac resin, a cresol novolac resin, and a naphthol novolac resin; polyfunctional phenol resins such as a triphenolmethane type phenol resin; modified phenol resins such as a terpene-modified phenol resin and a dicyclopentadiene-modified phenol resin; aralkyl type resins such as a phenol aralkyl resin having a phenylene skeleton and/or a biphenylene skeleton and a naphthol aralkyl resin having a phenylene and/or biphenylene skeleton; and bisphenol compounds such as bisphenol A and bisphenol F. Regarding these, one kind thereof may be used alone, or two or more kinds thereof may be used in combination. With such a phenol resin-based curing agent, the balance between flame resistance, moisture resistance, electrical characteristics, curability, storage stability, and the like is improved. In particular, from the viewpoint of curability, for example, the hydroxyl group equivalent of the phenol resin-based curing agent can be set to be equal to or more than 90 g/eq and equal to or less than 250 g/eq.

In addition, examples of the curing agent that can be used in combination include a polyaddition type curing agent, a catalyst type curing agent, and a condensation type curing agent.

Examples of the polyaddition type curing agent include polyamine compounds, including aliphatic polyamines such as diethylenetriamine (DETA), triethylenetetramine (TETA) and methaxylenediamine (MXDA), aromatic polyamines such as diaminodiphenylmethane (DDM), m-phenylenediamine (MPDA), and diaminodiphenylsulfone (DDS), dicyandiamide (DICY), and an organic acid dihydrazide; acid anhydrides, including alicyclic acid anhydrides such as hexahydrophthalic anhydride (HHPA) and methyltetrahydrophthalic anhydride (MTHPA), and aromatic acid anhydrides such as trimellitic anhydride (TMA), pyromellitic anhydride (PMDA), and benzophenonetetracarboxylic acid (BTDA); polyphenol compounds such as a novolac type phenol resin and a phenol polymer; polymercaptan compounds such as a polysulfide, a thioester, and a thioether; isocyanate compounds such as an isocyanate prepolymer and a blocked isocyanate; and organic acids such as a carboxylic acid-containing polyester resin.

Examples of the catalyst type curing agent include tertiary amine compounds such as benzyldimethylamine (BDMA) and 2,4,6-trisdimethylaminomethylphenol (DMP-30); imidazole compounds such as 2-methylimidazole and 2-ethyl-4-methylimidazole (EMI24); and Lewis acids such as a BF3 complex.

Examples of the condensation type curing agent include a resol resin, a urea resin such as a methylol group-containing urea resin; and a melamine resin such as a methylol group-containing melamine resin.

When such other curing agents are used in combination, the lower limit value of the content of the phenol resin-based curing agent is preferably equal to or more than 20% by mass, more preferably equal to or more than 30% by mass, and particularly preferably equal to or more than 50% by mass, with respect to all the curing agents. When the blending proportion is within the above-described range, satisfactory fluidity can be exhibited while maintaining flame resistance. The upper limit value of the content of the phenol resin-based curing agent is not particularly limited; however, the upper limit value is preferably equal to or less than 100% by mass with respect to all the curing agents.

The lower limit value of the total value of the contents of the curing agents in the resin composition for encapsulation according to the present invention is not particularly limited; however, the lower limit value is preferably equal to or more than 0.8% by mass, and more preferably equal to or more than 1.5% by mass, with respect to the total amount of the resin composition for encapsulation. When the lower limit value of the blending proportion is within the above-described range, satisfactory curability can be obtained. Furthermore, the upper limit value of the total value of the contents of the curing agents with respect to the resin composition for encapsulation is not particularly limited; however, the upper limit value is preferably equal to or less than 12% by mass, and more preferably equal to or less than 10% by mass, with respect to the total amount of the resin composition for encapsulation.

Incidentally, it is preferable that the phenol resin as a curing agent and the epoxy resin are blended such that the equivalent ratio (EP)/(OH) of the number of epoxy groups (EP) in the resin composition for encapsulation and the number of phenolic hydroxyl groups (OH) of all the phenol resins is equal to or more than 0.8 and equal to or less than 1.3. When the equivalent ratio is within the above-described range, sufficient curing characteristics can be obtained when molding the obtained resin composition for encapsulation. However, when a resin other than a phenol resin, which can react with the epoxy resin, is used in combination, the equivalent ratio may be adjusted as appropriate.

[Inorganic Filler]

Examples of the inorganic filler that is used for the resin composition for encapsulation of the present embodiment include fused silica such as fused crushed silica and fused spherical silica, crystalline silica, alumina, kaolin, talc, clay, mica, rock wool, wollastonite, glass powder, glass flakes, glass beads, glass fiber, silicon carbide, silicon nitride, aluminum nitride, carbon black, graphite, titanium dioxide, calcium carbonate, calcium sulfate, barium carbonate, magnesium carbonate, magnesium sulfate, barium sulfate, cellulose, aramid, wood, and pulverized powders obtained by pulverizing cured products of a phenol resin molding material and an epoxy resin molding material. Among these, silicas such as fused crushed silica, fused spherical silica, and crystalline silica are preferred, and fused spherical silica is more preferred. Furthermore, among these, calcium carbonate and wollastonite are preferred in terms of cost. Regarding the inorganic filler, one kind thereof may be used alone, or two or more kinds thereof may be used in combination.

The average particle size $D_{50}$ of the inorganic filler is preferably equal to or more than 0.01 μm and equal to or less than 75 μm, and more preferably equal to or more than 0.05 μm and equal to or less than 50 μm. By setting the average particle size of the inorganic filler to be within the above-described range, the filling property in the mold is improved. Furthermore, by setting the upper limit value of the average particle size of the inorganic filler to be equal to or less than 75 μm, the filling property is further improved. The average particle size $D_{50}$ was defined as the volume-equivalent average particle size given by a laser diffraction type measuring apparatus, RODOS SR type (SYMPATEC HEROS & RODOS).

Furthermore, in the resin composition for encapsulation according to the present invention, the inorganic filler can include spherical silica having equal to or more than two kinds of different average particle diameters $D_{50}$. As a result, the fluidity and filling property at the time of transfer molding can be enhanced.

The content of the inorganic filler is preferably equal to or more than 50% by mass, more preferably equal to or more than 60% by mass, even more preferably equal to or more than 65% by mass, and particularly preferably equal to or more than 75% by mass, with respect to the total amount of the resin composition for encapsulation. When the lower limit value is within the above-described range, an increase in the amount of moisture absorption and a decrease in strength concomitant with curing of the obtained resin composition for encapsulation can be reduced. Furthermore, the amount of the inorganic filler is preferably equal to or less than 93% by mass, more preferably equal to or less than 91% by mass, and even more preferably equal to or less than 90% by mass, with respect to the total amount of the resin composition for encapsulation. When the upper limit value is within the above-described range, the obtained resin composition for encapsulation has satisfactory fluidity and also has satisfactory moldability. Therefore, the production stability of the encapsulated structure is increased, and a structure having an excellent balance between product yield and durability is obtained.

When silica such as fused crushed silica, fused spherical silica, or crystalline silica is used as the inorganic filler, the content of silica is preferably equal to or more than 40% by mass, and more preferably equal to or more than 60% by mass, with respect to the total amount of the resin composition for encapsulation. When the lower limit value is within the above-described range, the balance between the fluidity and the coefficient of thermal expansion of the resin composition for encapsulation at the time of transfer molding is improved.

When the inorganic filler is used in combination with an inorganic flame retardant, such as a metal hydroxide such as aluminum hydroxide or magnesium hydroxide, zinc borate, zinc molybdate, or antimony trioxide, it is desirable that the total amount of these inorganic flame retardants and the inorganic filler is set to be within the range of the content of the inorganic filler.

[Curing Accelerator]

Regarding the curing accelerator that is used for the resin composition for encapsulation of the present embodiment, it is preferable to use imidazoles. The imidazoles can include, for example, one kind or two or more kinds selected from imidazole compounds such as imidazole, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4,5-dihydroxydimethylimidazole, and 2-phenyl-4-methyl-5-hydroxymethylimidazole; 1-cyanoethyl-2-undecylimidazolium trimellitate, 1-cyanoethyl-2-phenylimidazolium trimellitate, 2,4-diamino-6-[2'-methylimidazolyl(1')]-ethyl-s-triazine, 2,4-diamino-6-[2'-undecylimidazolyl(1')]-ethyl-s-triazine, 2,4-diamino-6-[2'-ethyl-4-methylimidazolyl(1')]-ethyl-s-triazine, isocyanuric acid adduct of 2,4-diamino-6-[2'-methylimidazolyl(1')]-ethyl-s-triazine, isocyanuric acid adduct of 2-phenylimidazole, and isocyanuric acid adduct of 2-methylimidazole.

When imidazoles are used as the curing accelerator, the content of the imidazoles is preferably equal to or more than 0.01% by mass, more preferably equal to or more than 0.03% by mass, and particularly preferably equal to or more than 0.05% by mass, with respect to the total amount of the resin composition for encapsulation. By setting the content of the imidazoles to be equal to or more than the above-described lower limit value, the temperature cycle resistance of the obtained encapsulant can be enhanced more effectively. It is also possible to enhance the curability at the time of encapsulation molding. On the other hand, the content of the imidazoles is preferably equal to or less than 2.0% by mass, more preferably equal to or less than 1.0% by mass, and particularly preferably equal to or less than 0.5% by mass, with respect to the total amount of the resin composition for encapsulation. By setting the content of the imidazoles to be equal to or less than the above-described upper limit value, the fluidity at the time of transfer molding can be enhanced, which can contribute to enhancement of the filling property.

The curing accelerator can further include, in addition to the imidazoles, for example, one kind or two or more kinds selected from phosphorus atom-containing compounds such as an organic phosphine, a tetra-substituted phosphonium compound, a phosphobetaine compound, an adduct of a phosphine compound and a quinone compound, and an adduct of a phosphonium compound and a silane compound; and amine-based curing accelerators other than imidazoles, such as 1,8-diazabicyclo(5,4,0) undecene.

Examples of the organic phosphine that can be used for the resin composition for encapsulation include primary phosphines such as ethylphosphine and phenylphosphine; secondary phosphines such as dimethylphosphine and diphenylphosphine; and tertiary phosphines such as trimethylphosphine, triethylphosphine, tributylphosphine, and triphenylphosphine.

Examples of the tetra-substituted phosphonium compound that can be used for the resin composition for encapsulation include a compound represented by the following General Formula (4).

(4)

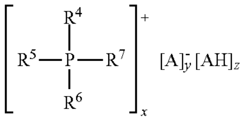

In the above-described General Formula (4), P represents a phosphorus atom. $R^4$, $R^5$, $R^6$, and $R^7$ each represent aromatic group or an alkyl group. A represents an anion of an aromatic organic acid having at least one unit of any one functional group selected from a hydroxyl group, a carboxyl group, and a thiol group in the aromatic ring. AH represents an aromatic organic acid having at least one unit of any one functional group selected from a hydroxyl group, a carboxyl group, and a thiol group in the aromatic ring. x and y are each a number of 1 to 3; z is a number of 0 to 3, and x=y.

The compound represented by General Formula (4) is obtained, for example, as follows; however, the compound is not limited to this. First, a tetra-substituted phosphonium halide, an aromatic organic acid, and a base are mixed with an organic solvent, the mixture is uniformly mixed, and an aromatic organic acid anion is generated in the solution system. Next, when water is added thereto, a compound represented by General Formula (4) can be precipitated. With regard to the compound represented by General Formula (4), it is preferable that $R^4$, $R^5$, $R^6$, and $R^7$ bonded to the phosphorus atom are each a phenyl group; AH is a compound having a hydroxyl group in the aromatic ring, that is, a phenol; and A is anion of the phenol. Examples of the phenol include monocyclic phenols such as phenol, cresol, resorcin, and catechol; condensed polycyclic phenols such as naphthol, dihydroxynaphthalene, and anthraquinol; bisphenols such as bisphenol A, bisphenol F, and bisphenol S; and polycyclic phenols such as phenylphenol and biphenol.

Examples of the phosphobetaine compound that is used as the curing accelerator include a compound represented by the following General Formula (5).

(5)

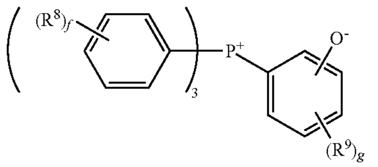

In the above-described General Formula (5), $R^8$ represents an alkyl group having 1 to 3 carbon atoms, and $R^9$ represents a hydroxyl group. f is a number of 0 to 5, and g is a number of 0 to 3.

The compound represented by General Formula (5) is obtained, for example, as follows. The compound is obtained through a step of first bringing a triaromatic-substituted phosphine, which is a tertiary phosphine, into contact with a diazonium salt and substituting the triaromatic-substituted phosphine with a diazonium group of the diazonium salt. However, the compound is not limited to this.

Examples of the adduct of a phosphine compound and a quinone compound, which is used as the curing accelerator, include a compound represented by the following General Formula (6).

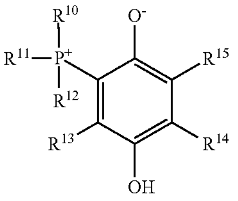

(6)

In the above-described General Formula (6), P represents a phosphorus atom. $R^{10}$, $R^{11}$, and $R^{12}$ each represent an alkyl group having 1 to 12 carbon atoms or an aryl group having 6 to 12 carbon atoms, and they may be identical with or different from each other. $R^{13}$, $R^{14}$, and $R^{15}$ each represent a hydrogen atom or a hydrocarbon group having 1 to 12 carbon atoms, while they may be identical with or different from each other; and $R^{14}$ and $R^{15}$ may be bonded to form a cyclic structure.

Regarding the phosphine compound that is used for the adduct of a phosphine compound and a quinone compound, for example, a compound in which the aromatic ring is unsubstituted or a substituent such as an alkyl group or an alkoxyl group is present in the aromatic ring, such as triphenylphosphine, a tris(alkylphenyl)phosphine, a tris (alkoxyphenyl)phosphine, trinaphthylphosphine, or tris (benzyl)phosphine, is preferred, and examples of the substituent such as an alkyl group or an alkoxyl group include those having 1 to 6 carbon atoms. Triphenylphosphine is preferred from the viewpoint of easy availability.

Furthermore, examples of the quinone compound that is used for the adduct of a phosphine compound and a quinone compound include benzoquinone and anthraquinones, and above all, p-benzoquinone is preferred from the viewpoint of storage stability.

Regarding a method for producing an adduct of a phosphine compound and a quinone compound, the adduct can be obtained by bringing an organic tertiary phosphine and a benzoquinone into contact with each other in a solvent in which both the compounds can be dissolved, and mixing the compounds. The solvent may be a solvent having low dissolvability for the adduct, among ketones such as acetone and methyl ethyl ketone. However, the compound is not limited to this.

With regard to the compound represented by General Formula (6), a compound in which $R^{10}$, $R^{11}$, and $R^{12}$ bonded to the phosphorus atom are each a phenyl group; and $R^{13}$, $R^{14}$, and $R^{15}$ are each a hydrogen atom, that is, a compound to which 1,4-benzoquinone and triphenylphosphine have been added, is preferable from the viewpoint of lowering the hot elastic modulus of a cured product of the resin composition for encapsulation.

Examples of the adduct of a phosphonium compound and a silane compound, which is used as the curing accelerator, include a compound represented by the following General Formula (7).

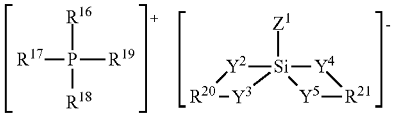

(7)

In the above-described General Formula (7), P represents a phosphorus atom, and Si represents a silicon atom. $R^{16}$, $R^{17}$, $R^{18}$, and $R^{19}$ each represent an organic group having an aromatic ring or a heterocyclic ring, or an aliphatic group, and they may be identical with or different from each other. In the formula, $R^{20}$ is an organic group bonded to the groups $Y^2$ and $Y^3$. In the formula, $R^{21}$ is an organic group bonded to the groups $Y^4$ and $Y^5$. $Y^2$ and $Y^3$ each represent a group formed when a proton-donating group releases a proton, and the groups $Y^2$ and $Y^3$ in the same molecule are bonded to the silicon atom to form a chelate structure. $Y^4$ and $Y^5$ each represent a group formed when a proton-donating group releases a proton, and the groups $Y^4$ and $Y^5$ in the same molecule are bonded to the silicon atom to form a chelate structure. $R^{20}$ and $R^{21}$ may be identical with or different from each other, and $Y^2$, $Y^3$, $Y^4$, and $Y^5$ may be identical with or different from each other. $Z^1$ is an organic group having an aromatic ring or a heterocyclic ring, or an aliphatic group.

In General Formula (7), examples of $R^{16}$, $R^{17}$, $R^{18}$, and $R^{19}$ include a phenyl group, a methylphenyl group, a methoxyphenyl group, a hydroxyphenyl group, a naphthyl group, a hydroxynaphthyl group, a benzyl group, a methyl group, an ethyl group, an n-butyl group, an n-octyl group, and a cyclohexyl group, and among these, an aromatic group having a substituent such as an alkyl group, an alkoxy group, or a hydroxyl group, or an unsubstituted aromatic group, such as a phenyl group, a methylphenyl group, a methoxyphenyl group, a hydroxyphenyl group, or a hydroxynaphthyl group, is more preferred.

Furthermore, in General Formula (7), $R^{20}$ is an organic group that is bonded to $Y^2$ and $Y^3$. Similarly, $R^{21}$ is an organic group that is bonded to the groups $Y^4$ and $Y^5$. $Y^2$ and $Y^3$ are each a group formed when a proton-donating group releases a proton, and the groups $Y^2$ and $Y^3$ in the same molecule are bonded to the silicon atom to form a chelate structure. Similarly, $Y^4$ and $Y^5$ are each a group formed when a proton-donating group releases a proton, and the groups $Y^4$ and $Y^5$ in the same molecule are bonded to the silicon atom to form a chelate structure. The groups $R^{20}$ and $R^{21}$ may be identical with or different from each other, and the groups $Y^2$, $Y^3$, $Y^4$, and $Y^5$ may be identical or different from each other. The groups represented by $—Y^2—R^{20}—Y^3—$ and $—Y^4—R^{21}—Y^5$-in such General Formula (7) are each composed of a group formed when a proton donor releases two protons, and the proton donor is preferably an organic acid having at least two carboxyl groups or hydroxyl groups in the molecule, more preferably an aromatic compound having at least two carboxyl groups or hydroxyl groups on adjoining carbon atoms that constitute the aromatic ring, and even more preferably an aromatic compound having at least two hydroxyl groups on adjoining carbon atoms that constitute the aromatic ring. Examples thereof include catechol, pyrogallol, 1,2-dihydroxynaphthalene, 2,3-dihydroxynaphthalene, 2,2'-biphenol, 1,1'-bi-2-naphthol, salicylic acid, 1-hydroxy-2-naphthoic acid, 3-hydroxy-2-naphthoic acid, chloranilic acid, tannic acid, 2-hydroxybenzyl alcohol, 1,2-cyclohexanediol, 1,2-propanediol, and glycerin, and among these, catechol, 1,2-dihydroxynaphthalene, and 2,3-dihydroxynaphthalene are more preferred.

Furthermore, $Z^1$ in General Formula (7) represents an organic group having an aromatic ring or a heterocyclic ring, or an aliphatic group, and specific examples thereof include aliphatic hydrocarbon groups such as a methyl group, an ethyl group, a propyl group, a butyl group, a hexyl group, and an octyl group; aromatic hydrocarbon groups such as a phenyl group, a benzyl group, a naphthyl group, and a biphenyl group; glycidyloxy groups such as a glycidyloxypropyl group, a mercaptopropyl group, and an aminopropyl group; and reactive substituents such as a mercapto group, an alkyl group having an amino group, and a vinyl group, while among these, a methyl group, an ethyl group, a phenyl group, a naphthyl group, and a biphenyl group are more preferred from the viewpoint of thermal stability.

Regarding a method for producing an adduct of a phosphonium compound and a silane compound, a silane compound such as phenyltrimethoxysilane and a proton donor such as 2,3-dihydroxynaphthalene are introduced into a flask containing methanol and dissolved, and then a sodium methoxide-methanol solution is added dropwise thereto while being stirred at room temperature. When a solution prepared in advance, in which a tetra-substituted phosphonium halide such as tetraphenylphosphonium bromide is dissolved in methanol, is further added dropwise while being stirred at room temperature, crystals are precipitated. When the precipitated crystals are filtered, washed with water, and vacuum-dried, an adduct of a phosphonium compound and a silane compound is obtained. However, the method is not limited to this.

The content of the curing accelerator is preferably equal to or more than 0.05% by mass, more preferably equal to or more than 0.08% by mass, and particularly preferably equal to or more than 0.10% by mass, with respect to the total amount of the resin composition for encapsulation. By setting the content of the curing accelerator to be equal to or more than the above-described lower limit value, the curability of the resin composition for encapsulation at the time of transfer molding can be effectively enhanced. On the other hand, the content of the curing accelerator is preferably equal to or less than 2.0% by mass, more preferably equal to or less than 1.0% by mass, and particularly preferably equal to or less than 0.5% by mass, with respect to the total amount of the resin composition for encapsulation. By setting the content of the curing accelerator to be equal to or less than the above-described upper limit value, the fluidity at the time of encapsulation can be enhanced, which can contribute to an enhancement of the filling property.

[Wax]

The resin composition for encapsulation according to the present embodiment includes a wax having a melting point of from 30° ° C. to 90° C. By including such a wax, the resin composition for encapsulation has satisfactory meltability at the temperature applied in transfer molding, thereby the fluidity at the time of encapsulation is enhanced, and the filling property can be enhanced. Examples of such a wax include natural waxes such as carnauba wax; synthetic waxes such as montanic acid ester wax and polyethylene oxide wax; and higher fatty acids such as zinc stearate, and metal salts thereof.

The blending amount of the wax is, for example, equal to or more than 0.05% by mass and equal to or less than 2.0% by mass with respect to the total amount of the resin composition for encapsulation. The lower limit value of the blending amount of the wax is preferably equal to or more than 0.1% by mass, and more preferably equal to or more than 0.2% by mass, with respect to the total amount of the resin composition for encapsulation. The upper limit value of the blending amount of the wax is preferably equal to or less than 1.5% by mass, and more preferably equal to or less than 1.0% by mass, with respect to the total amount of the resin composition for encapsulation. The resin composition for encapsulation obtainable by blending the wax in the above-described range has excellent fluidity and filling property at the time of transfer molding.

[Coupling Agent]

The resin composition for encapsulation according to the present invention may include a coupling agent such as a silane coupling agent in order to enhance the adhesiveness between the epoxy resin and the inorganic filler. Examples of the coupling agent include an epoxysilane, an aminosilane, a ureidosilane, and a mercaptosilane.

Examples of the epoxysilane include γ-glycidoxypropyltriethoxysilane, γ-glycidoxypropyltrimethoxysilane, γ-glycidoxypropylmethyldimethoxysilane, and β-(3,4-epoxycyclohexyl)ethyltrimethoxysilane. Examples of the aminosilane include γ-aminopropyltriethoxysilane, γ-aminopropyltrimethoxysilane, N-β-(aminoethyl)-γ-aminopropyltrimethoxysilane, N-β-(aminoethyl)-γ-aminopropylmethyldimethoxysilane, N-phenyl-γ-aminopropyltriethoxysilane, N-phenyl-γ-aminopropyltrimethoxysilane, N-β-(aminoethyl)-γ-aminopropyltriethoxysilane, N-6-(aminohexyl)-3-aminopropyltrimethoxysilane, and N-(3-(trimethoxysilylpropyl)-1,3-benzenedimethanane. Examples of the ureidosilane include γ-ureidopropyltriethoxysilane and hexamethyldisilazane. A latent aminosilane coupling agent having the primary amino moiety of aminosilane protected by reacting the primary amino moiety with a ketone or an aldehyde may also be used. Furthermore, the aminosilane may have a secondary amino group. Examples of the mercaptosilane include γ-mercaptopropyltrimethoxysilane and 3-mercaptopropylmethyldimethoxysilane, as well as a silane coupling agent that exhibits a function similar to that of a mercaptosilane coupling agent by thermal decomposition, such as bis(3-triethoxysilylpropyl) tetrasulfide or bis(3-triethoxysilylpropyl) disulfide. Furthermore, regarding these silane coupling agents, products that have been subjected to a hydrolysis reaction in advance may be blended. Regarding these silane coupling agents, one kind thereof may be used alone, or two or more kinds thereof may be used in combination.

From the viewpoint of continuous moldability, a mercaptosilane is preferred; from the viewpoint of fluidity, an aminosilane is preferred; and from the viewpoint of adhesion, an epoxysilane is preferred.

The lower limit value of the content of the coupling agent such as the silane coupling agent that can be used for the resin composition for encapsulation according to the present invention is preferably equal to or more than 0.01% by mass, more preferably equal to or more than 0.05% by mass, and particularly preferably equal to or more than 0.1% by mass, with respect to the total amount of the resin composition for encapsulation. When the lower limit value of the content of the coupling agent such as a silane coupling agent is within the above-described range, the interface strength between the epoxy resin and the inorganic filler is not decreased, and satisfactory vibration resistance can be obtained. The upper limit value of the content of the coupling agent such as a silane coupling agent is preferably equal to or less than 1% by mass, more preferably equal to or less than 0.8% by mass, and particularly preferably equal to or less than 0.6% by mass, with respect to the total amount of the resin composition for encapsulation. When the upper limit value of the content of the coupling agent such as a silane coupling agent is within the above-described range, the interface strength between the epoxy resin and the inorganic filler is not decreased, and satisfactory vibration resistance can be obtained. Furthermore, when the content of the coupling agent such as the silane coupling agent is within the above-described range, the water absorbability of a cured product of the resin composition for encapsulation is prevented from increasing.

[Other Additives]

In addition to the above-described components, the resin composition for encapsulation of the present embodiment may further include other additives such as a colorant, a flame retardant, and a mold release agent, as necessary.

Thus, the embodiments of the present invention have been described above; however, these are only examples of the present invention, and various configurations other than the above-described ones can be employed.

EXAMPLES

Hereinafter, the present invention will be described with reference to Examples and Comparative Examples; however, the present invention is not intended to be limited thereto.

Examples 1 to 4 and Comparative Examples 1 to 2

<Preparation of Tablet-Shaped Resin Composition for Encapsulation>

For each of the Examples and each of the Comparative Examples, a resin composition for encapsulation was prepared as follows.

A tablet-shaped resin composition for encapsulation was obtained by the methods of steps 1 to 3 described in the above-described section "Production of encapsulated structure", by using each of the components shown in Table 1.

The details of each component in Table 1 are as follows. Furthermore, the formulation shown in Table 1 shows the blending proportion (parts by mass) of each component with respect to the total amount of the resin composition.

(Epoxy Resin)

Epoxy resin 1: Orthocresol novolac type epoxy resin (manufactured by DIC Corporation, product name "EPICRON N-670")

Epoxy resin 2: Orthocresol novolac type epoxy resin (manufactured by DIC Corporation, product name "EPICRON N-685")

Epoxy resin 3: Tris(hydroxyphenyl) methane type epoxy resin (manufactured by Mitsubishi Chemical Corporation, product name "jER 1032H60")

(Curing Agent)

Phenol resin-based curing agent 1: Novolac type phenol resin (manufactured by Sumitomo Bakelite Co., Ltd., product name "SUMILITE RESIN PR-51470")

Phenol resin-based curing agent 2: Trisphenylmethane type phenol novolac resin (manufactured by Meiwa Plastic Industries, Ltd., product name "MEH-7500")

(Inorganic Filler Material)

Inorganic filler material 1: Fused spherical silica (manufactured by Denka Co., Ltd., product name "FB-950")

Inorganic filler material 2: Fused spherical silica (manufactured by Denka Co., Ltd., product name "FB-105")

Inorganic filler material 3: Fused crushed silica (manufactured by Fumitech Co., Ltd., product name "FMT-15C")

Inorganic filler material 4: Glass fiber (manufactured by Nitto Boseki Co., Ltd., product name "CS3E479")

(Curing Accelerator)

Curing accelerator 1: Tetraphenylphosphonium 2,3-dihydroxynaphthalate

Curing accelerator 2: Tetraphenylphosphonium 4,4-sulfonyldiphenolate

Curing accelerator 3: 2-Phenyl-4,5-dihydroxymethylimidazole (manufactured by Shikoku Chemicals Corporation)

(Wax)

Wax 1: Carnauba wax (manufactured by Toagosei Co., Ltd., product name "TOWAX-132", melting point: 83° C.)

Wax 2: Stearic acid (manufactured by NOF Corporation, product name "SR-SAKURA", melting point: 60° C.)

Wax 3: Diethanolamine-dimontanic acid ester (manufactured by Itoh Oil Chemicals Co., Ltd., product name "ITOHWAX TP NC-133", melting point: 78° C.)

Wax 4: Polyethylene oxide wax (manufactured by Clariant Japan K.K., product name "PED191", melting point: 122° C.)

Wax 5: Partially saponified ester wax (manufactured by Clariant Japan K.K., product name "LOCOWAX OP", melting point: 100° C.)

(Additives)

Silane coupling agent 1: N-phenyl-3-aminopropyltrimethoxysilane (Dow Corning Toray Co., Ltd., product name "CF-4083")

Silane coupling agent 2: γ-Glycidoxypropyltrimethoxysilane (manufactured by Shin-Etsu Chemical Co., Ltd., product name "KBM-403")

Carbon black: Carbon black (manufactured by Mitsubishi Chemical Corporation, product name "CARBON #5")

Low stress agent 1: Silicone rubber (manufactured by Dow Corning Toray Co., Ltd., product name "CF-2152")

Low stress agent 2: Silicone oil (manufactured by Dow Corning Toray Co., Ltd., product name "FZ-3730")

<Performance Evaluation for Tablet-Shaped Resin Composition for Encapsulation>

An obtained tablet-shaped resin composition for encapsulation was evaluated for the following items. The evaluation results are shown in the following Table 1.

(Continuous Extruder Workability)

The continuous workability at the time of obtaining a tablet-shaped resin composition for encapsulation having a diameter of 60 mm and a length of 200 mm by an extruder was evaluated. The evaluation criteria are shown below.

O: Extrusion of the tablet-shaped resin composition for encapsulation through a die can be continuously achieved ten or more times.

X: Extrusion of the tablet-shaped resin composition for encapsulation through a die is achieved less than ten times.

(Tablet Temperature)

The surface temperature of the tablet-shaped resin composition for encapsulation extruded through the die was measured with a surface thermometer.

(Tablet External Appearance)

The external appearance of the tablet-shaped resin composition for encapsulation extruded through the die was evaluated (diameter 60 mm, length 200 mm). The evaluation criteria are shown below.

O: No surface roughness or deformation of the tablet-shaped resin composition for encapsulation X: Surface roughness or deformation of the tablet-shaped resin composition for encapsulation is observed.

TABLE 1

| | | Example 1 | Example 2 | Example 3 | Example 4 | Comparative Example 1 | Comparative Example 2 |
|---|---|---|---|---|---|---|---|
| <Composition of resin composition for encapsulation> | | | | | | | |
| Epoxy resin | Epoxy resin 1 | 12.10 | | | 13.60 | 12.10 | 13.60 |
| | Epoxy resin 2 | | 13.20 | | | | |
| | Epoxy resin 3 | | | 8.80 | | | |
| Curing agent | Curing agent 1 | 5.25 | 6.25 | | 5.90 | 5.25 | 5.90 |
| | Curing agent 2 | | | 4.65 | | | |
| Inorganic filler | Inorganic filler 1 | 45.00 | 68.00 | 62.00 | | 45.00 | |
| | Inorganic filler 2 | 20.00 | 10.00 | 20.00 | | 20.00 | |
| | Inorganic filler 3 | 15.00 | | | 62.50 | 15.00 | 62.50 |
| | Inorganic filler 4 | | | | 15.00 | | 15.00 |
| Curing accelerator | Curing accelerator 1 | 0.30 | | | | 0.30 | |
| | Curing accelerator 2 | | 0.25 | 0.15 | | | |
| | Curing accelerator 3 | | | | 0.60 | | 0.60 |
| Wax | Wax 1 | 0.25 | 0.25 | 0.20 | 0.40 | | |
| | Wax 2 | 0.10 | 0.05 | | 0.20 | | |
| | Wax 3 | | | 0.15 | | | |
| | Wax 4 | | | | | 0.35 | |
| | Wax 5 | | | | | | 0.60 |
| Other additives | Silane coupling agent 1 | 0.20 | 0.20 | 0.15 | | 0.20 | |
| | Silane coupling agent 2 | | | 0.10 | | | |
| | Carbon black | 0.30 | 0.30 | 0.30 | 0.30 | 0.30 | 0.30 |
| | Low stress agent 1 | 1.00 | 1.00 | 3.00 | 1.50 | 1.00 | 1.50 |
| | Low stress agent 2 | 0.50 | 0.50 | 0.50 | | 0.50 | |
| Total | | 100.00 | 100.00 | 100.00 | 100.00 | 100.00 | 100.00 |
| <Performance evaluation for resin composition for encapsulation> | | | | | | | |
| Continuous extruder workability | | ○ | ○ | ○ | ○ | X | X |
| Tablet temperature [° C.] | | 88 | 90 | 85 | 86 | 93 | 90 |
| Tablet external appearance | | ○ | ○ | ○ | ○ | X | X |

All of the tablet-shaped resin compositions for encapsulation of Examples had excellent continuous extruder workability and had excellent external appearance.

This application claims priority on the basis of Japanese Patent Application No. 2021-059669, filed Mar. 31, 2021, the disclosure of which is incorporated herein in its entirety by reference.

REFERENCE SIGNS LIST

1: granular or powdered epoxy resin composition
2: hopper
41: heater
42: screw
43: cylinder
**43*a***: input side cylinder
5: die
51: temperature regulator
6: extruded material
10: electronic control device
11: electronic component
12: circuit board
30: molding mold
33: cavity
40: pot
50: gate
Ju: molten epoxy resin composition

The invention claimed is:

1. A method for producing an encapsulated structure, the method comprising:

a step of supplying granules or powder formed from an epoxy resin composition to an extruder equipped with a screw and a die provided at a tip of the screw, and heating and melting the granules or powder formed from the epoxy resin composition;

a step of extruding the molten epoxy resin composition through the die having a predetermined opening shape with a diameter of equal to or more than 40 mm and equal to or less than 100 mm by rotation of the screw at a temperature of equal to or higher than 80° C. and equal to or lower than 100° C., and wherein the die has a temperature of equal to or higher than 80° C. and equal to or lower than 100° C.;

a step of cutting the extruded epoxy resin composition using a cutter into a predetermined length to obtain a tablet formed from the epoxy resin composition, where the tablet has dimensions with a diameter of equal to or more than 40 mm and equal to or less than 100 mm and a length of equal to or more than 50 mm and equal to or less than 300 mm;

a step of transferring the tablet to a transfer molding machine having a molding mold in which an object to be encapsulated is disposed; and a step of obtaining an encapsulated structure by encapsulating the object to be encapsulated in the molding mold with the epoxy resin composition by a transfer molding method of using the transfer molding machine, wherein the epoxy resin composition includes:

an epoxy resin;

a curing agent;

an inorganic filler;

a curing accelerator; and a wax having a melting point of equal to or higher than 30° C. and equal to or lower than 90° C.

2. The method for producing an encapsulated structure according to claim 1, wherein the step of encapsulating is carried out at a temperature of equal to or higher than 120° C. and equal to or lower than 200° C. and a pressure of equal to or higher than 3 MPa and equal to or lower than 15 MPa.

* * * * *